Figure 1:
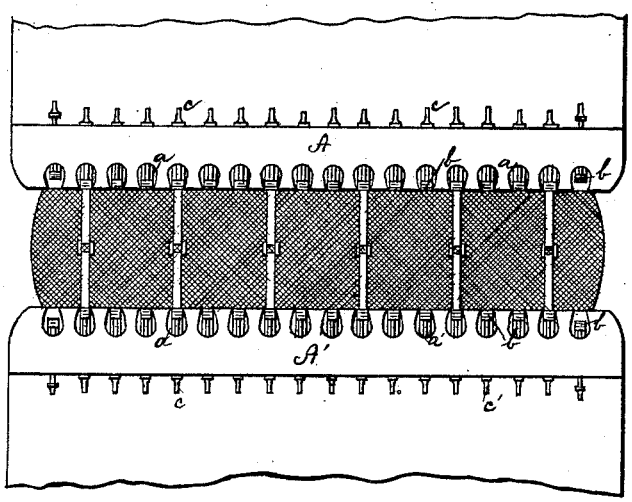

W. EWEN & H. M. EVANS.
BALING-PRESS.

No. 175,958. Patented April 11, 1876.

WITNESSES.
Hugh Pierson
Jno. L. Carter

INVENTORS.
Warren Ewen
H. M. Evans
By H. N. Jenkins
ATTORNEY.

UNITED STATES PATENT OFFICE.

WARREN EWEN AND HENRY M. EVANS, OF NEW ORLEANS, LOUISIANA.

IMPROVEMENT IN BALING-PRESSES.

Specification forming part of Letters Patent No. 175,958, dated April 11, 1876; application filed February 8, 1876.

*To all whom it may concern:*

Be it known that we, WARREN EWEN and HENRY M. EVANS, residents of the city of New Orleans and State of Louisiana, have invented a certain new and useful Improvement in Baling-Presses; and we do hereby declare the following to be a full, clear, and correct description of the same, reference being had to the annexed drawing, making a part of this specification.

This invention is designed to obviate the difficulty hitherto experienced, in the baling of cotton and other merchandise, in taking up the slack and fastening the bands so as to hold the bales, after having been discharged from the press, to their reduced pressed or compressed size, thereby permitting of a greater number of bales being stored away within a given space than heretofore attainable.

The nature of our invention consists in providing each groove of the press-platens with a clamping-bar for holding the bands close against the bale while their ends are being secured; but our invention will be more readily understood by referring to the drawing, on which—

Figure 2:
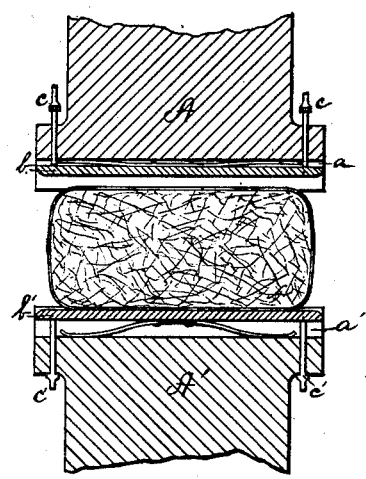

Figure 1 is a front view, and Fig. 2 a cross-section thereof.

A and A' are the upper and lower platens of a baling-press, each constructed in the usual manner, with grooves, $a$ $a'$, &c., for passing the bands around the bales. In these grooves are fitted our clamping-bars, $b$, which are provided at or near their ends with guide-stems $c$ $c'$. These work in perforations made in the platens or through strips of metal that are fastened to the sides thereof. On the side of the bars nearest the bottom of the grooves are fitted one or more springs for the purpose of pressing outward the said bars whenever it is desired that they should hold the bands against the bales. At Fig. 2 the bar $b$ of the upper platen is drawn back to leave room for the passage of the band, and the bar $b'$ of the lower platen is shown in its outward position as when holding the band against the bale. It is evident that when the bars of the upper and lower platens are brought to bear upon the bands of a bale under pressure, that not only can the ends of the bands be more easily and quickly secured together, but that, inasmuch as the said bands are held straight against the bale, there can be no slack in the same, and consequently they can be fastened so as to hold the bale to the exact size to which it is pressed.

We do not claim any special device for drawing back or holding the clamping-bars in the bottom of their grooves, it being obvious that various mechanical arrangements may be adopted for that purpose; but Having described our invention, what we claim as new, and desire to secure by Letters Patent, is—

The clamping-bars $b$, arranged to operate within the grooves of press-platens, for the purpose set forth.

WARREN EWEN.
H. M. EVANS.

Witnesses:
HUGH PIERSON,
JNO. S. CARTER.